United States Patent [19]

Frink

[11] Patent Number: 4,497,614
[45] Date of Patent: Feb. 5, 1985

[54] HELICOPTER TRANSPORTABLE MUD PUMP

[75] Inventor: Shelby T. Frink, Odessa, Tex.

[73] Assignee: Oime, Inc., Odessa, Tex.

[21] Appl. No.: 474,993

[22] Filed: Mar. 14, 1983

[51] Int. Cl.³ .................. F04B 19/00; F04B 39/14; F16D 1/00
[52] U.S. Cl. .................. 417/238; 417/362; 417/539; 403/335
[58] Field of Search .......... 417/238, 319, 539, 362; 403/335, 336, 337, 4; 464/49

[56] References Cited

U.S. PATENT DOCUMENTS

| | | | |
|---|---|---|---|
| 1,109,836 | 9/1914 | Hanson | 403/4 |
| 1,720,422 | 7/1929 | Manville | 403/4 |
| 1,750,170 | 3/1930 | Frisch | 417/238 |
| 1,754,231 | 4/1930 | Farmer | 417/539 X |
| 1,891,771 | 12/1932 | Mendenhall et al. | 417/539 X |
| 2,108,958 | 2/1938 | Brightwell | 417/539 |
| 2,561,227 | 7/1951 | Reed | 417/238 |
| 3,364,871 | 1/1968 | Wilson | 417/539 X |
| 3,451,282 | 6/1969 | Appleton | 464/49 X |
| 3,520,151 | 7/1970 | Resener | 464/49 |
| 3,637,330 | 1/1972 | Goeldner | 417/539 X |
| 4,407,598 | 10/1983 | Hendershot | 403/4 |

Primary Examiner—William L. Freeh
Assistant Examiner—Paul F. Neils
Attorney, Agent, or Firm—Marcus L. Bates

[57] ABSTRACT

A helicopter transportable mud pump made into three stages, each of which is separable from one another. Each pump stage is made into a lightweight sub-assembly which can be lifted by a helicopter into inaccessible locations. The adjacent crankshaft ends of the assembled pump stages are series connected in axially aligned relationship respective to one another by a special coupling and drive means. The coupling means is comprised of two coacting coupling members, each of which have confronting faces connected together in a manner to dispose the adjacent shaft ends of the multistage pump 120° out of phase respective to one another. The coupling halves are identical in design so that only one member must be duplicated during fabrication of the device.

5 Claims, 7 Drawing Figures

4,497,614

HELICOPTER TRANSPORTABLE MUD PUMP

BACKGROUND OF THE INVENTION

There are large drilling rigs specially designed to be airlifted by helicopter into locations inaccessible by other forms of transportation. Therefore, there is also a need for a mud pump which can be easily broken down, or disassembled, into packages of a size which can be lifted by a helicopter into remote drilling locations. Presently available mud pumps which are light enough to be airlifted are smaller than desired for drilling rigs, and in order to attain the required flow, these pumps must be operated at speeds which cause high maintenance problems. Therefore, it is desirable to have made available a pump apparatus which has the required capacity and which can be dismantled into convenient packages for helicopter transport.

The present invention achieves the above desired results by the provision of a pump having three single acting cylinders, commonly known as a triplex pump. Rather than dismantling the pump into a power end component and fluid end component as has been in the past, the pump is designed as a three single cylinder assembly, wherein each cylinder is a single acting pump (simplex) with the shaft ends of each simplex pump being axially aligned with one another and connected together with special couplings so that the throws of the three crankshafts are timed 120° apart in order to have a balanced throw and discharge flow.

SUMMARY OF THE INVENTION

A multi-stage pump assembly separable into individual pump stages to facilitate translocation from one to another geographical area. Each stage includes an individual simplex pump having laterally opposed crankshaft ends, a piston connected to the throw of the crankshaft and reciprocatingly received within a cylinder, and a crankshaft housing. The adjacent crankshaft ends of adjacent pump stages are axially aligned with one another and connected together in timed relationship by a coupling means. The coupling means is in the form of a toothed chain sprocket and includes a first and a second coupling member, or coupling half, attachable to adjacent shaft ends of adjacent pump stages. Each member of the coupling has a confronting face, a chain and sprocket means connects the members together and to a drive so that the shafts remain in the same timed relationship respective to one another. In the triplex pump of this invention, the throw of the crankshafts remain 120° apart.

The coupling halves are substantially identical to one another. Each coupling half has means formed thereon which is located 30° out of phase respective to the location of the crankshaft at top or bottom dead center, thereby causing each piston of any stage to always be timed 120° out of phase respective to the piston of an adjacent stage.

Accordingly, a primary object of the present invention is the provision of means by which the individual stages of a multi-stage pump assembly is always maintained in proper timed relationship respective to one another.

Another object of the present invention is the provision of a multi-stage pump assembly separable into individual stages to facilitate transport thereof.

Still a further object of the present invention is the provision of a coupling member by which adjacent stages of a multi-stage pump are connected together in timed relationship respective to one another.

Another and still further object of the present invention is the provision of improvements in coupling members for coupling adjacent axially aligned series connected shaft ends together in a manner to maintain each shaft in a predetermined timed relationship respective to an adjacent shaft.

An additional object of the present invention is the provision of a method of connecting adjacent series connected shafts together in timed relationship respective to one another.

These and various other objects and advantages of the invention will become readily apparent to those skilled in the art upon reading the following detailed description and claims and by referring to the accompanying drawings.

The above objects are attained in accordance with the present invention by the provision of a method for use with apparatus fabricated in a manner substantially as described in the above abstract and summary.

DETAILED DESCRIPTION OF THE PREFERRED EMBODIMENTS

Figure 1:
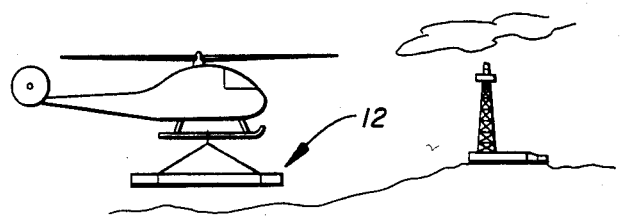
FIG. 1 is a perspective view of one stage of a multi-stage pump, made in accordance with the present invention, being airlifted to a drilling rig.
Figure 2:
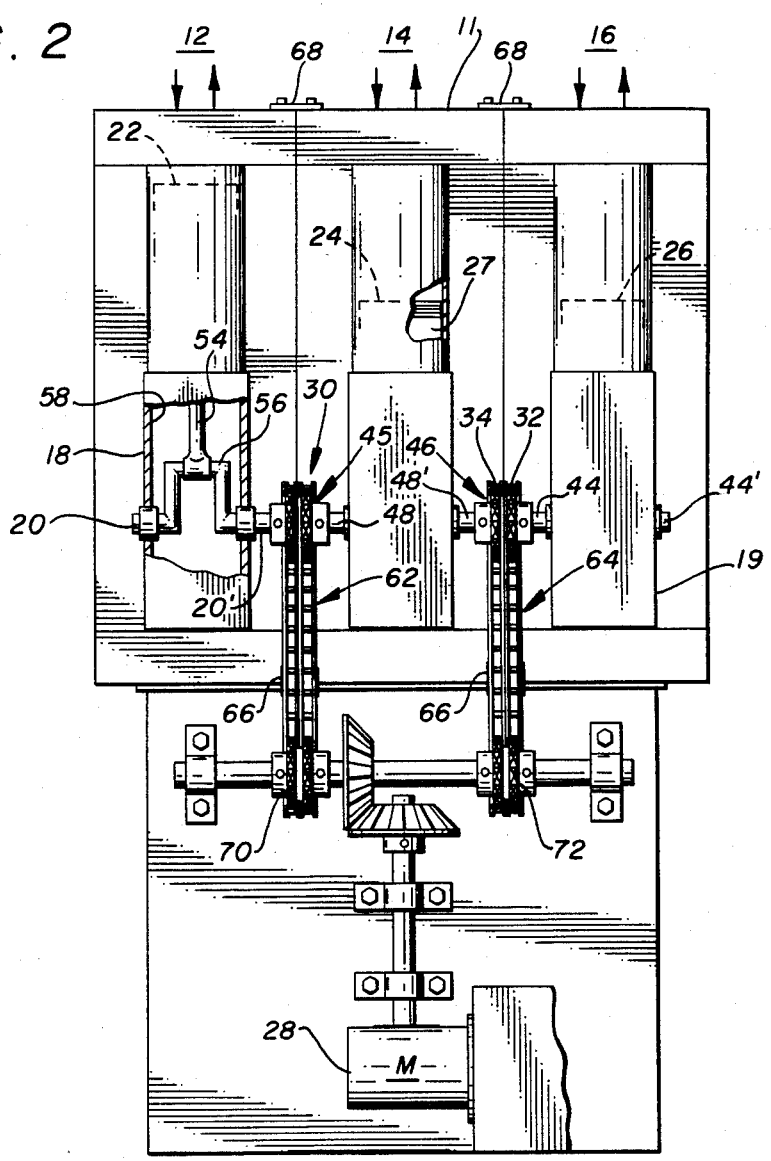
FIG. 2 is a broken, top plan view of a multi-stage pump, made in accordance with the present invention, with some parts thereof being broken away therefrom in order to more fully disclose the interior thereof.

In FIG. 1 of the drawings, a helicopter is disclosed transporting a part 12 of a mud pump to a drilling rig. In FIG. 2 of the drawings, there is disclosed a multi-stage pump assembly having a main frame 11, which is separable into individual pump stages 12, 14, and 16. Each of the stages include a pump barrel 18 and a case 19 through which shaft ends 20, 20' extend in diametrical opposition to one another.

Numerals 22, 24, and 26 of FIG. 2 indicate one of the positions of the pistons of each stage, which preferably are 120° apart so that a balanced crankshaft throw and discharge flow is achieved by the multi-stage pump. Numeral 27 indicates one of the pistons of the multi-stage pump, while numeral 28 indicates a prime mover, which can take on any number of forms.

The adjacent shaft ends of the axially aligned shafts are connected together by a coupling means illustrated herein as a coupling assembly 30. As seen in FIGS. 2-7, each coupling assembly comprises a coupling member 32 and another identical coupling member 34, sometimes also called a coupling half. Each coupling half includes a hub 36 opposed to a face 38. The faces of the pair of coupling members which jointly constitute a coupling assembly confront one another. Each confronting face 38 includes an index means 40 for aligning adjacent coupling members in a manner to time the associate simplex pump to which the coupling member is affixed, and at least one face includes index means 40, 41, and 42.

Stage 16 includes shaft ends 44 and 44', while stage 14 includes shaft ends 48 and 48'. Stages 12, 14, and 16 present adjacent shaft ends, generally indicated by the arrow at numerals 45 and 46, which are connected together 120° out of phase by one of the coupling assemblies of this disclosure.

Figure 4:
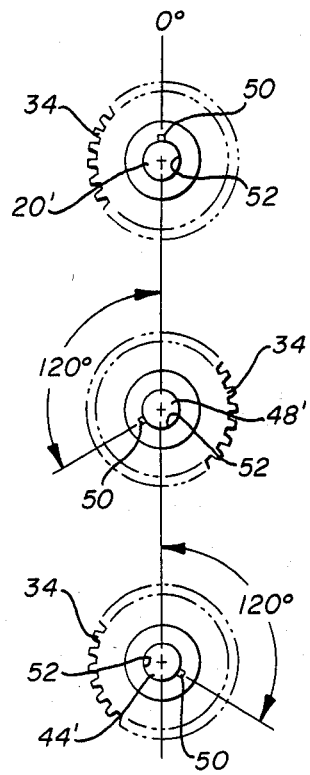
FIG. 4 is a diagrammatical representation of the shaft ends of the apparatus disclosed in FIG. 2.
Figure 5:
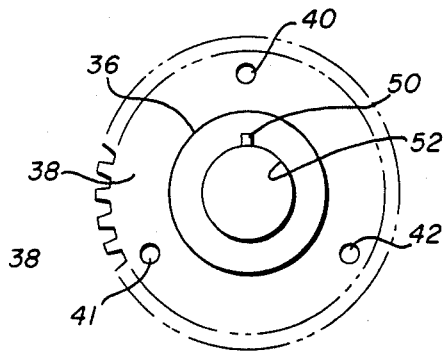
FIGS. 5 and 6 are front elevational views of the coupling member seen in FIG. 3.
Figure 6:
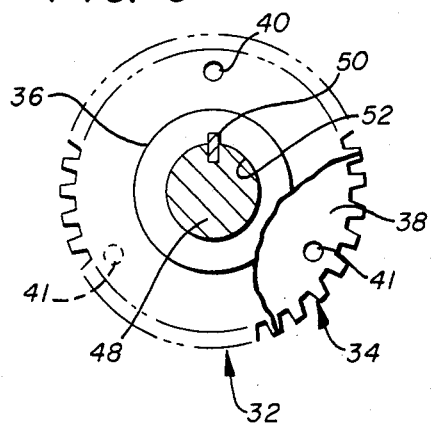

As seen in FIGS. 4-6, each coupling half is provided with a key way 50 and shaft hole 52, although the shaft hole could equally well be splined or otherwise rigidly connected in a removable manner to the coupling hub.

Each pump stage includes the usual connecting rod 54 connected to crank 56 at one end and a piston 24 at the other end thereof. Numeral 58 indicates the interior of a stage of the pump.

If desired, the coupling halves may be assembled together with a resilient member being interposed therebetween at 60, and a bolt can be used to removably affix one coupling half to the other.

Figure 3:
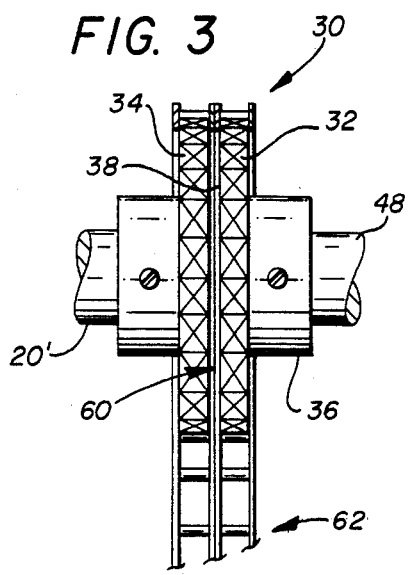
FIG. 3 is an enlarged, assembled view of one of the coupling members disclosed in FIG. 2.
Figure 7:
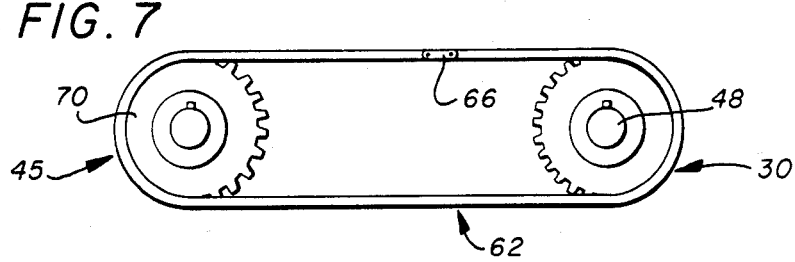
FIG. 7 is a side view of part of the apparatus disclosed in FIG. 2.

In FIGS. 2, 3, and 7, the two coupling halves are joined together by a separable, double row, endless chain 62 and 64 having a master link 66 included therein by which the chain can be removed from the halves, and the stages of the pump separated. In FIG. 2, numeral 68 broadly indicates attachment means by which the frame of the individual stages of the multi-stage pump can be disconnected one from the other.

As seen in FIGS. 2 and 7, together with other figures of the drawings, each coupling half is connected together by the double row endless chain 62 or 64. The chain 62 meshes with sprockets 70 and 45, while chain 64 meshes with sprockets 72 and 46. Motor 28 drives the drive sprockets 70 and 72, which drive chains 62 and 64. The coupling assemblies 45 and 46 are held by endless chains 62 and 64 so that each confronting half 32 and 34 cannot be moved, respective to one another, and at the same time the adjacent shaft ends of adjacent stages are timed in proper sequence respective to one another.

The hole 40 is located in phase or in time respective to the crank of the shaft end to which the coupling half is attached. Key way 50 usually is indexed with top dead center of the piston. In the present disclosure, the hole 40 and key way 50 can be indexed in phase either at top dead center or bottom dead center. Holes 41 and 42 are located 120° apart respective to one another and to hole 40.

Identical coupling halves 32 and 34, when joined together at 30 in the manner of FIGS. 2, 3, 4, and 7, cause the adjacent shaft ends of the three pump stages to be oriented respective to one another to arrange the crank throws or pistons 120° out of phase. Accordingly, the employment of four identical coupling halves, 32 or 34, to provide two coupling means or coupling assemblies 30 of FIGS. 2, 3 and 7, by which the three stages of the multi-stage pump are tied together, results in the cranks of the three stages always being 120° out of phase. This enables the prime mover 28 to continually deliver smooth power to the multi-stage pump, and the flow from the multi-stage pump is continuous because one of the stages is always positively displacing fluid therefrom.

The pump stages are assembled by bolting the frame together at 68. The coupling halves 32, 34 of a coupling assembly are rotated until hole 40 of one half is aligned with hole 41 or 42 of the other half. The double row chain is next meshed with sprocket 70, for example, and a coupling assembly, and the master link installed. This holds the coupling halves together with adjacent pump stages being 120° out of phase.

In order to avoid timing pump stages 12 and 16 in phase with one another and 120° out of phase with stage 14, it is expedient to paint or otherwise provide indicia which indicates that the proper hole 41 or 42 is aligned with hole 40. The extra holes can be eliminated, for example, by placing a threaded fastener in the extra holes, to thereby avoid the possibility of improperly timing the pump stages.

Those skilled in the art will appreciate that the coupling halves of one coupling assembly 30 should be arranged with holes 40 and 41 aligned, for example, while the other coupling assembly should be arranged with holes 40 and 42 aligned with one another, in order that each of the three stages are placed 120° out of phase with one another.

Moreover, two independent single row endless chains can be used at 62, rather than a single double row endless chain, while remaining within the comprehension of this invention. Each single row chain must be provided with a master link. The use of two adjacent single row chains at 62 does maintain the adjacent pump stages in proper timed relationship, and at the same time imposes different operating loads onto the adjacent shaft ends, which in some instances is more desirable as contrasted to the results obtained with the use of a double row chain.

I claim:

1. In a multi-stage pump assembly separable into three individual stages to facilitate transport thereof from one to another geographical location; wherein each individual stage includes a simplex pump having a crankshaft, a piston connected to said crankshaft and reciprocatingly received within a cylinder, and a crankshaft housing; said crankshaft extends laterally respective to said cylinder and away from said housing so that a prime mover can be connected thereto; the combination with said multi-stage pump assembly of a coupling means by which the adjacent shaft ends of adjacent stages can be connected together to cause the piston of each stage to be arranged in timed relationship respective to the other pistons of the other stages;

said coupling means includes a first and second coupling half which can be attached to adjacent shaft ends of adjacent stages to connect one stage to another stage;

each coupling half has a face formed thereon which confronts the face of the other half of the coupling means, and a drive means connecting the two coupling halves together so that the shafts remain in the same relative position respective to one another;

each said coupling half is substantially identical to other of the coupling halves and include means forming indicia thereon, the indicia is located respective to the location of the crank of the crankshaft whereby each piston of each stage is timed 120° respective to one another;

means forming a chain sprocket on each said coupling member; the drive means includes two rows of endless chain arranged to be placed in meshed relationship to a drive sprocket, wherein the drive sprocket includes a row of teeth for meshing with each endless chain; whereby the two rows of chain can be meshed with the coupling member and the drive sprocket and thereby maintain the coupling members properly indexed respective to one another.

2. The combination of claim 1 wherein said indicia of each coupling half includes a plurality of holes located in spaced relationship respective to one another and arranged 120° apart; the hole of one half is aligned with the hole of another half in order to time adjacent stages 120° apart.

3. In a multi-stage pump assembly separable into individual stages to facilitate transport thereof from one to another geographical location; wherein ach stage includes a simplex pump having a cankshaft, a piston connected to said crankshaft and reciprocatingly received within a cylinder, and a crankshaft housing; said crankshaft extends laterally respective to said cylinder and away from said housing so that a prime mover can be connected thereto; the improvement comprising:

coupling means by which the adjacent shaft ends of adjacent stages can be arranged adjacent to one another and connected together to cause the piston of each stage to be arranged in timed relationship respective to the other pistons of the other stages;

said coupling means includes a coupling half affixed to adjacent shaft ends, each coupling half has a face formed thereon which confronts the face of the other half of the coupling means, and a drive means connecting the two coupling halves together so that the shafts of each stage remain in the same relative position respective to one another;

each said coupling half has indicia formed thereon related to the position of the crankshaft to which the coupling half is attached;

said halves are substantially identical to one another, there are three stages in said multi-stage pump, said indicia is located 120° out of time respective to the location of the crankshaft at top dead center, thereby causing each of the pistons to be timed 120° respective to one another when the indicia of adjacent said halves is aligned;

means by which each coupling half is formed into a chain sprocket, said drive means includes two rows of endless chain which can be connected to a common double toothed drive sprocket which is driven by the prime mover; so that one row of the chain can be meashed with each copuling half and with one of the rows of teeth on the drive sprocket.

4. The copuling means of claim 3 wherein said indicia of each coupling half includes a plurality of holes located in spaced relationship respective to one another and arranged 120° apart; the hole of one half is aligned with the hole of another half in order to time adjacent stages 120° apart.

5. The coupling member of claim 4 wherein one of the holes is located 120° out of phase with respect to the shaft, and another hole is located in phase with the shaft, so that each adjacent connected shafts are placed 120° out of phase with one another.

* * * * *

UNITED STATES PATENT AND TRADEMARK OFFICE
CERTIFICATE OF CORRECTION

PATENT NO. : 4,497,614

DATED : February 5, 1985

INVENTOR(S) : SHELBY T. FRINK

It is certified that error appears in the above-identified patent and that said Letters Patent is hereby corrected as shown below:

Column 5, line 11, substitute --each-- for "ach";

Column 6, line 16, correct the spelling of "coupling";
Line 18, correct the spelling of "coupling".

Signed and Sealed this

Second Day of July 1985

[SEAL]

*Attest:*

DONALD J. QUIGG

*Attesting Officer*     *Acting Commissioner of Patents and Trademarks*